3,147,698
COMPRESSIBLE MATERIAL FOR USE IN PRINTING

William C. Ross, Winchester, Mass., assignor to W. R. Grace & Co., Cambridge, Mass., a corporation of Connecticut
No Drawing. Filed Nov. 18, 1960, Ser. No. 70,125
10 Claims. (Cl. 101—149.2)

This invention relates to a resilient, compressible material for use in printing. The material may be used either as an offset blanket in lithographic printing, as packing on the impression cylinder in rotary press printing or for any other printing use where a resilient, compressible cushioning material is needed.

The primary function of the lithograph blanket is the transfer of ink from the printing plate to the paper. In order to perform this function, the surface of the blanket must pick up and transfer ink and must not be damaged by repeated contact with the ingredients of the ink. The blanket as a whole must be so constructed that application of normal printing pressures will reduce the thickness of the blanket by the amount which is accepted as the standard compression in present day practice, i.e. two to four mils. In addition, the blanket must possess sufficient resilience so that after being squeezed between the cylinders of the press, it will return to its original thickness quickly enough to be ready for the next impression. A most important property of the blanket is that by its nature and structure it must permit the development of the even, uniform printing pressures which are vital to the high quality of the finished printing. Furthermore, the blanket must have a firm, non-extensible base in order that it may be held under tension on the offset cylinder without stretching or becoming distorted in any way.

The type of lithograph blanket in use at the present time is composed of a layer of fairly soft rubber applied to a carcass of firm non-extensible woven material. In one method of manufacturing such a blanket, the carcass is made by bonding together three or four layers of the woven material with thin layers of rubber adhesive. The rubber layer is built up on the carcass by applying successive thin layers of rubber cement until the desired thickness of rubber, usually about 0.022 to 0.025 inch, has been deposited. The whole assembly is then cured.

The rubber-textile blanket described above, while it is resilient, stretches very little and has a good ink-transfer surface, has a serious tendency to develop uneven pressures in different portions of the work. This property of the blanket is due to the inherent characteristics of the solid rubber used in its construction.

Solid rubber is a distortable and resilient substance. It is not compressible in the true sense of the word, since it cannot be forced into a space smaller than that which it originally occupied. A blanket containing solid rubber can be reduced in thickness only by distorting the rubber, alowing it to creep or flow toward the unconfined edges of the blanket with the consequent tendency to smear the ink; by forcing the rubber to flow into the body of the textile layers used as a backing; or by applying so much pressure that the textile backing itself is compressed. Furthermore, the pressure needed to effect a reduction in the thickness of solid rubber increases substantially with the amount of thickness reduction, even in the relatively small range of between two mils and four mils reduction.

There are several sources of variation in pressure during the printing operation. One of these is the irregularities normally encountered in the paper, printing plates and the printing press. These irregularities lead to varying amounts of compression of the blanket as it passes between the cylinders, and hence to local variations in printing pressure.

An even greater source of difficulty is the pressure variation which can be caused by uneven thickness of the blanket itself. This is such an important consideration in lithographic printing that the surfaces of the solid rubber textile blankets described above are normally ground after cure until the desired uniform thickness and smooth printing surface are obtained. Grinding a rubber surface with the precision required in lithography is a difficult and tedious operation, however, and adds a costly step to the manufacture of the lithograph blanket. Furthermore, even though the greatest care is used in manufacture and the blanket is precision ground, low spots will often develop in a blanket when it is stretched around the cylinder of the printing press, due to uneven stretching of the fabric backing around the cylinder.

Rubber lithograph blankets also tend to develop low spots during use. Although the blankets have sufficient resilience so that the surface will ordinarily return to normal after each sheet of paper is printed, it has been found that certain items, notably card stock and envelopes, will in time produce a permanent impression in the blanket. Such damage to the blanket cannot ordinarily be repaired, and the damaged blanket must be discarded.

It has been recognized in the past that a blanket which was truly compressible would overcome some of the above-described difficulties of offset lithographic printing. A compressible material may be forced into a smaller space than that which it originally occupied; in other words, its volume may be reduced without increasing its lateral dimensions. For this reason, a compressible blanket has been found to adjust itself more readily to irregularities in the printing plates, the press or the paper than the conventional solid rubber textile blankets. It has been found, furthermore, that irregularities in the surface of the blanket itself are less troublesome when the blanket is compressible.

Various devices have been used in an attempt to introduce the desirable feature of compresibility into the lithograph blanket. In some cases, the body of the blanket has been made of sponge rubber. In others, a compressible layer such as blotting paper has been attached to the underside of the blanket. In still another type of blanket, rubber cups were affixed to the back of the blanket and were somewhat flattened against the cylinder during printing, thus imparting the characteristic of compressibility to the blanket.

Although the basic concept of compressibility in lithograph blankets was a sound one, the devices used in the prior art to achieve compressibility did not result in practical, useable, or commercially successful blankets. Sponge rubber as it is commonly known today is too soft and compressible, and does not permit the development of the desired printing pressures. A paper layer underneath the blanket contributes some compressibility, but it is not resilient enough to produce the desired results. The use of mechanical devices such as deformable cups or metal springs is too cumbersome to be practical for modern high speed printing and furthermore, does not give the closely controlled, even surface pressure necessary for fine-grained printing.

A primary object of my invention is to produce a new kind of sheet material for use in lithographic and other types of printing which will combine the desired properties of volume compressibility, resistance to lateral distortion, enough firmness to permit the development of the necessary printing pressure, a high degree of resilience and the ability to compensate for irregularities in printing plates, press and paper at the desired printing pressures without the development of harmful localized differences in pressure in different portions of the sheet materials. Another object of my invention is to provide a blanket for lithographic printing which will contain as a cushioning element the new sheet material of my invention. Further objects of my invention are to eliminate the necessity of grinding the surface of the lithograph blanket and to produce a blanket which will be less subject to damage from lumps of dried ink or paper dust, or to the formation of low spots in the printing of items such as cards or envelopes. Finally, my invention has for its object the development of a cushioning element for lithograph blankets which may be stripped from the carcass of the blanket after it has become damaged or worn, and which may be replaced by a new cushioning element without removing the blanket carcass from the printing press.

I have discovered a new type of compressible material which is ideally suited for use as the cushioning element in lithographic and other types of printing. The compressible material of my invention is made by impregnating a highly porous felted fibrous web with an elastomeric material in solution or water dispersion and subsequently curing the impregnated web under such conditions that it retains a high degree of porosity. The large volume of air in the finished impregnated sheet is responsible for its compressibility. Since the sheet may be compressed in thickness without substantial increase of its lateral dimensions, it is said to be "volume compressible." Structurally, the impregnated fibrous web of my invention is characterized by the presence of a multiplicity of very evenly distributed, interconnected, minute voids or air spaces surrounded by a tough, reinforced fiber-rubber structure. These air spaces provide areas into which the surrounding material may be displaced by the application of pressure, eliminating the necessity for massive flow of the entire body of the blanket and preventing build-up of pressure as the thickness of the blanket is reduced. The material which surrounds the voids, on the other hand, acts as a multitude of tiny, almost microscopic springs, which push back against the web surface and make possible the pick-up and transfer of the ink. Obviously, this spring material must be strong enough to resist compression under less than the desired printing pressures if satisfactory printing is to result.

The impregnated fibrous sheet material must possess certain well defined characteristics which make it suitable for use in printing operations. In the first place, it must be highly resilient so that it can spring back quickly to its original thickness after having been compressed by the printing roll. The recovery must, in addition, be rapid enough so that a new impression can be transferred with each rotation of the printing roll, even at the high speeds, such as 500 revolutions per minute, which are in common use today.

The impregnated material must also possess a certain minimum degree of firmness, or resistance to compression, so that at least a certain minimum amount of pressure must be applied to the material in order to effect the amount of compression customarily used in printing. The pressure required for this amount of compression must be at least enough to press the material into even contact with the printing plate or paper and to permit adequate ink pick-up and transfer, i.e. must be a pressure suitable for printing. For convenience, I express the firmness of the compressible material in terms of the pressure which must be exerted on the material in order to reduce its original thickness by two mils, i.e. to effect an initial compression of two mils.

I have found that the compressible impregnated fibrous sheet material of my invention must have sufficient firmness so that at least 10 pounds per square inch must be applied to the sheet in order to effect an initial compression of two mils. Materials which are of a noticeably lower firmness than the minimum figure given above do not permit the development of the printing pressure necessary for good ink pick-up and transfer. Such materials as, for example, the sponge rubber blankets of the prior art flatten out until they are compressed far beyond the desired two to four mils under the application of much lower pressure than those necessary for good printing. For this reason, the sponge rubber blankets of the prior art did not permit the use of sufficiently high printing pressures to give satisfactory results.

The degree of porosity of the impregnated fibrous web must also be controlled in order for the impregnated material to give effective printing results. I have found, rather surprisingly, that it is not the initial porosity of the impregnated sheet which determines its printing effectiveness, but rather the residual porosity after the sheet has been compressed to a certain degree.

The amount of porosity still remaining in the sheet after it has been compressed by the normal amount encountered during the printing process, which I call the "residual porosity," determines whether the sheet has the ability to be compressed still further when necessary in order to compensate for high spots in the plates, extra thicknesses of paper and other irregularities, without building up localized uneven pressures. Since the average compression encountered in printing is about four mils, I have for convenience taken the residual porosity at four mils compression as a measure of the effectiveness of the impregnated sheet material of my invention.

I have determined in the course of many experiments that the impregnated fibrous sheets of my invention must possess at least about 37 percent residual porosity at four mils compression in order to be acceptable for use in printing. Above this porosity, the sheets have sufficient compressibility so that they give excellent results when used in lithographic blankets. Sheets having less than 37 percent residual porosity, on the other hand, give unacceptable printing results. Such low porosity sheets are unable to be compressed to the required degree during printing without developing undesirable localized high pressures. The effect of these localized high pressures is rather unexpected. Instead of the distortion of the blanket, and hence of the image, which is experienced with rubber blankets, these low porosity materials develop pressure differences which correspond to the pattern of the fibers within the fibrous web. Higher pressures develop in the denser areas and lower pressures in the less dense portions of the sheet. Since the amount of ink transfer varies with the pressure, the pattern of the formation of the paper is transferred to the sheet being printed. This phenomenon, which is especially apparent when large areas of solid color are being printed, is responsible for the uneven, unacceptable printing results obtained with impregnated fibrous sheets having less than 37 percent residual porosity at four mils compression.

My invention will be more clearly understood by reference to the following examples, in which the ream weight of the fibrous webs is the weight in pounds of five hundred 24 by 36 inch sheets, and the density is the ream weight divided by the thickness of the sheets in mils.

EXAMPLE I

The non-extensible backing for the lithograph blanket of this example was made from a lightweight superfine cotton duck fabric. The fabric was prestretched in order to give satisfactory dimensional stability to the blanket, after which three plies of the stretched fabric were put together with a neoprene latex adhesive between the plies. The compressible member was made from a 120 pound ream weight natural fiber paper consisting of 70 percent mercerized cotton linters and 30 percent of short paper fibers and having an average density of about 4. This paper was impregnated with a vulcanizable natural rubber latex compound in such an amount that the weight of the rubber in the impregnated sheet was 72 percent of the weight of the fiber. The impregnated sheet was then adhered to the 3-ply carcass with a layer of a butadiene-acrylonitrile copolymer latex adhesive and the assembly was press cured at 250° F. for 20 minutes with the distance between plates of the press being set at 0.062 inch. An ink-transfer surface was applied to the blanket by coating the impregnated paper surface with a 0.002 inch layer of a polyurethane elastomer cement. The finished thickness of the blanket was 0.064 inch, of which 0.038 inch was the 3-ply carcass, 0.024 inch was the compressible member and 0.002 inch was the print-transfer surface.

It was determined by experiment that the compressible member of the blanket had a firmness of about 10 pounds per square inch. The compressible member was also found to have an initial porosity of 60.5 percent and a residual porosity at four mils compression of 52.5 percent. When used on a conventional lithograph press, the blanket was found to give excellent results in printing.

EXAMPLE II

The blanket of this example was made by substantially the same procedure and from the same raw materials as the blanket of Example I. In this case, however, the weight of the rubber in the impregnated sheet was only about 50 percent of the weight of the fiber and the distance between the plates of the press was set at 0.063 inch. The finished blanket was 0.065 inch thick, of which 0.038 inch was the 3-ply backing, 0.025 inch was the compressible member and 0.002 inch was the print-transfer surface.

The initial porosity of the compressible member of the blanket was 66.4 percent and the residual porosity at four mils compression was 60 percent. It was determined by experiment that the firmness of the compressible layer of the blanket was about 5 pounds per square inch. When used on a conventional lithograph press, this blanket was found to be too soft to give satisfactory results in printing.

The above example shows clearly how the characteristics of the impregnated fibrous sheet may be varied by changing the conditions of its manufacture. The only differences between the blankets of Examples I and II are the greater quantity of rubber in the impregnated sheet and the slightly higher curing pressure used in Example I. These differences were sufficient to produce a much firmer blanket which was suitable for lithographic printing, as opposed to the unsatisfactory blanket of Example II.

EXAMPLE III

Three plies of the prestretched fabric of Example I were bonded together with a neoprene latex to form a non-extensible backing. The backing member was pressed under high pressure to effect some reduction in its thickness before the compression member was attached to it. The compression member was made by impregnating a paper similar to that of Examples I and II in all respects except that it had a ream weight of 130 pounds. The impregnant consisted of 80 percent of a butadiene-acrylonitrile copolymer latex and 20 percent of a solution of a phenolic resin, and the impregnated sheet contained 60 percent of the rubber-resin mixture based on the weight of the fibers. The compression member was dried after impregnation, hot calendered to a thickness of 0.028 inch and then cured in a hot-air oven. The backing member and the compression member were cemented together with a butadiene-acrylonitrile copolymer latex adhesive, and the whole assembly was pressed together to a thickness of 0.060 inch. A polyurethane print-transfer surface 0.004 inch thick was applied to the top of the impregnated sheet as in the previous examples.

The total thickness of the blanket was 0.064 inch, of which the backing was 0.036 inch thick, the compression member was 0.024 inch thick and the ink-transfer surface was 0.004 inch thick. The initial porosity of the compressible layer was 65 percent and its residual porosity at four mils compression was 58 percent. The firmness of the compressible layer was about 15 pounds per square inch. The blanket of this example gave excellent results in printing.

The backing member and paper used in the above example were very similar to those of Example II, and the proportion of voids in the compressible material was also very close to that of Example II. Example III is of particular interest because it shows how by varying the nature of the impregnant to include a harder resin, I was able to make a substantial increase in the firmness of the blanket without sacrificing any of the porosity or compressibility of the blanket.

EXAMPLE IV

A blanket carcass was made from two plies of a heavy duck cemented together with a neoprene latex adhesive. An impregnating paper having a ream weight of 182 pounds and a density of about 4.5 was impregnated with a Buna-N latex until the weight of the rubber was 72 percent of the weight of the fiber. The impregnated sheet was cemented to the carcass with a butadiene-acrylonitrile copolymer latex adhesive and the whole assembly was press cured at 250° F. for 20 minutes with the plates of the press set at a distance of 0.064 inch. After curing, a 0.002 inch thick layer of a butadiene-acrylonitrile copolymer latex compound was applied to the top of the impregnated sheet to act as a print-transfer surface. The finished blanket was 0.066 inch thick, of which 0.036 inch was the carcass, 0.028 inch was the compressible member, and 0.002 inch was the print-transfer surface. The initial porosity of the compressible layer was 49.2 percent and its residual porosity at four mils compression was 40.7 percent. The firmness of the compressible layer of the blanket was about 18 pounds per square inch. The blanket gave excellent results when used in lithographic printing.

An important and economically practical aspect of my invention is made possible by the nature of the compressible material made according to the above examples.

The top surface of a lithograph blanket, which is constantly exposed to the application and release of pressure and to contact with various surfaces during the printing operation, wears out much faster than the carcass of the blanket. Until now, the entire blanket has had to be replaced when the wear on the top surface was severe enough to cause imperfections in printing. Because of the structure and method of manufacture of conventional solid rubber-textile lithograph blankets, there has been no possible way to apply a new top surface to a worn blanket.

My invention makes it possible to replace the top portion of a lithograph blanket without removing the blanket from the impression cylinder.

I have found that the compressible portion of lithograph blankets made according to the above examples, i.e. the rubber-impregnated fibrous web together with its thin ink-transfer surface, may, if desired, be detached from the non-extensible backing after a period of use, and may be replaced by a new unit without the necessity of removing the blanket carcass from the lithograph press. This procedure not only saves the cost of the blanket carcass, which does not wear out as soon as the rest of the blanket; it also saves the time of the pressman, since he does not have to repeat the tedious and time-consuming operation of placing a new blanket on the press.

The following example illustrates this aspect of my invention.

EXAMPLE V

A compressible member was made by impregnating a fibrous web with latex following the directions given in Example I. Instead of being finished as part of the whole blanket, the impregnated sheet was press cured to a thickness of 0.024 inch and was coated with a 0.002 inch ink-transfer layer of a polyurethane elastomer cement. This unit was then coated on the back with a neoprene cement and applied by means of a roller to a carcass prepared in accordance with the procedure of Example I.

The resulting lithograph blanket was used for printing until it showed so much wear that it would normally need to be replaced. The compressible layer was then stripped with relative ease from the blanket carcass. A new unit consisting of the impregnated fibrous web described above, press cured to a thickness of 0.024 inch and having a polyurethane ink-transfer surface, was coated with a neoprene cement and rolled on to the blanket carcass. If desired, the coating of neoprene cement may be applied to the replaceable portion of the blanket at the time of its manufacture. In this case, the tacky cement layer is covered with a protective sheet, for example, a silicone-treated paper, which is removed from the replaceable unit prior to its application to the blanket carcass.

EXAMPLE VI

A compressible member was made from a 118 pound ream weight natural fiber paper consisting of 70 percent mercerized cotton linters and 30 percent of short paper fibers and having a density of about 4. This paper was impregnated with a nitrile rubber latex modified with a melamine resin in such an amount that the weight of rubber in the impregnated sheet was 82 percent of the weight of the fiber. The impregnated sheet was hot calendered to a thickness of 0.027 inch and then coated with a nitrile rubber ink-transfer surface 0.004 inch in thickness. This unit was press cured to a final thickness of 0.0265 inch and coated on the back with a 0.001 inch layer of a pressure-sensitive adhesive based on an acrylonitrile rubber.

The replacement unit so made had a firmness such that a pressure of 13 pounds per square inch had to be exerted on the unit in order to effect an initial compression of two mils. It was found to have an initial porosity of 55.6 percent and a residual porosity of 46 percent. When applied to a blanket carcass as shown in Example V, the replacement unit gave excellent printing results.

The bond between the carcass and the compressible member in the above examples was found to be strong enough to hold the top portion of the blanket firmly in place during the printing operation, yet it could be broken with sufficient ease to allow the compressible member to be stripped from the carcass when necessary. I have found it possible to make several replacements of the compressible member of the blanket according to the above directions while the carcass of the original blanket was still on the press.

The replaceabe portion of the blanket may be adhered to the carcass by means of the cements shown in the above examples. Alternatively, any pressure-sensitive adhesive may be used, as, for example, solvent cements made from natural rubber, polyvinyl ether or polyisobutylene, usually with the addition of a resin for the purpose of increasing the tackiness of the dried adhesive film. I may also use for this same purpose a heat-activated cement, which may be softened, for example by blowing warm air on the blanket, prior to the removal of the worn top layer. The adhesive film on the replacement unit is also softened by warming before the application of the new unit to the blanket carcass. On cooling, a strong bond is developed between the carcass and the replacement unit. Heat-activated cements are well-known in the art, and include such materials as cellulose esters and ethers, polyvinyl acetate, and acetalized vinyl polymers, usually compounded with waxes and plasticizers to give proper flow at a suitable temperature.

It is evident from the foregoing that a wide range of adhesives may be used for adhering the replacement unit of my invention to the carcass. In general, the adhesive must produce a bond which is resistant to the action of the solvents used for cleaning the press; it must have enough initial tack so that the replacement unit will be held firmly in place during the printing operation; and the bond formed must be capable of being ruptured by a reasonable amount of force when the replacement unit is to be stripped from the carcass.

Because the forces applied to the blanket during printing are absorbed by the compressible layer, there is far less tendency toward creep or shifting between the replacement unit of my invention and the carcass than would be the case if a non-compressible solid rubber material were used. Hence the adhesive bond necessary to hold the replacement unit in position is relatively small and may be broken with relative ease. The amount of adhesive force which may be used for this purpose has been determined by means of a peel strength test. Replacement units were cemented to backing materials with a variety of cements and under a variety of conditions and were then stripped apart with enough force to cause a separation of 10 linear inches per minute. The amount of force needed for separation was compared with printing performance and ease of strippability. It was found that both satisfactory adhesion and strippability were obtained when a force of 0.05 pound to 14 pounds per linear inch had to be exerted in order to separate the carcass from the replacement unit.

The replacement unit of my invention, as it is supplied to the lithographer, may include merely the compressible body portion and the ink-transfer surface, or it may also include the adhesive layer, as shown in the above examples. Alternatively, if desired, the ink-transfer surface may be supplied separately and may be applied to the compressible body portion after it has been affixed to the carcass.

The blankets described in the above examples, both the completely assembled and the so-called "renewable face" blankets, were subjected to a number of tests. In one such test, I measured the pressure in pounds per square inch which must be applied to the blanket in order to reduce its thickness by amounts varying from one to ten mils. Similar measurements were made on a large number of compressible impregnated fibrous sheets which had not been incorporated into blankets. In another test, the proportion of voids, or porosity, of the impregnated fibrous sheet was varied over a wide range, and the pressure needed to compress samples of varying porosities was recorded. The porosity of the samples was varied by using a fibrous web of more or less open structure, by changing the quantity or nature of the impregnant, and by using more or less pressure during the curing step. The proportion of voids was then calculated by means of the following equation:

$$\frac{\text{Total volume of web} - \text{volume of fibers} - \text{volume of rubber}}{\text{Total volume of web}}$$

$= \text{Proportion of voids as percent of total volume of web}$

In still another series of tests, various blankets were used on a lithographic printing press and the quality of the resulant printing was observed. Similar tests were made with a number of conventional rubber blankets.

As a result of all these tests, I became convinced that the lithographic blankets made according to my invention were novel both in structure and in performance, and in addition had a number of distinct advantages over the blankets of the prior art. Subsequent experience with the blanket has reinforced this conclusion. Blankets made from the compressible material of my invention have given excellent printing results, both in the form of assembled blankets and particularly in the form of the so-called "renewable face" blanket. In addition, the compressible material may be used as packing material on the impression cylinder in rotary press work, also with outstandingly successful results.

The results of the tests described above led me to believe that the essence of my invention lay in certain important characteristics of the new printing blanket as a whole, namely the firmness and compressibility of the whole printing blanket.

I initially defined the "firmness" of the blanket as the pressure in pounds per square inch which must be exerted on the blanket in order to make an initial thickness reduction of two mils. The minimum firmness which was found necessary in order to develop the proper back pressure against the paper being printed was 15 pounds per square inch. I also found that the compressible element of the blanket would ordinarily have a firmness of at least about 10 pounds per square inch, as shown by the foregoing examples.

The "compressibility" of the blanket was defined as the increase in pressure which must be applied to the blanket in order to increase its compression from two mils to four mils. I observed at this time that the truly compressible materials of my invention could be reduced in thickness by the application of a relatively small amount of pressure and that further reduction in thickness required the application of only small increases of pressure. This characteristic, which is responsible for the even, uniform pressures developed across the whole width of my improved blanket, was believed to be the most important reason for the excellent printing results obtained. Blankets which required an increase of pressure of not more than about 35 pounds per square inch in order to effect the desired compression were found to give good results in printing; blankets which required more than this amount of pressure gave poor and imperfect printing. In addition, the compressible element itself was found to have a compressibility such that not more than about 60 pounds of pressure must be exerted on it in order to effect the desired compression. The compressibility of the blankets made according to the above examples was in every case sufficient so that not more than 35 pounds per square inch had to be exerted on the blanket in order to incease its compression from two to four mils. The compressibility of the impregnated fibrous webs was closely similar to that of the blankets, except in the case of Example VI, in which an increase of pressure of 46 pounds per square inch had to be applied to the impregnated sheet in order to increase its compression from two to four mils.

I observed, furthermore, that the impregnated fibrous web must have a certain level of porosity, or void volume, in order for the material to possess the desired compressibility. My tests showed that the pressure needed to compress a number of samples of varying porosity was nearly constant as long as the porosity of the samples was above about 49 percent. When the porosity of the samples was below this figure, however, the pressure needed for compression was much higher. Such low porosity samples did not possess sufficient compressibility and did not give satisfactory results in printing. I concluded, therefore, that the critical limit of porosity of the impregnated fibrous material was about 49 percent.

As a result of extensive testing of the new compressible material and of blankets containing this material under a wide variety of printing conditions, it has become evident that the factors once believed to be controlling are not the only properties of my new material which are responsible for its unique performance in the printing field. I have, therefore, conducted a more extensive study of printing blankets and particularly of the compressible impregnated fibrous sheet material which I use as a cushioning element, in order to determine what factors are responsible for the excellent printing results I have obtained.

As a result of this work, I have become convinced that my invention lies more in the nature of the compressible material itself than in the characteristics of the completely assembled blanket. Extensive testing of compressible material applied directly to the printing roll, without the use of any backing layer, as well as tests of blankets made with a wide variety of backing materials, have reinforced this conclusion.

I have found that my original conclusion as to the necessary firmness of the impregnated sheet material was valid. The material of my invention must be firm enough so that at least 10 pounds per square inch pressure must be exerted on the sheet in order to effect an initial compression of two mils. If the material is softer than this, due either to the nature or amount of the impregnant or to an excessively large proportion of voids in the sheet, it is impossible to develop enough pressure for effective printing.

I have found, on the other hand, that the range of compressibilities set forth above does not apply to all the compressible materials of my invention; and, furthermore, that the degree of compressibility of the sheet material as defined above cannot always be used to distinguish operable from inoperable impregnated fibrous sheets. These facts will be understood more clearly by reference to the following examples.

EXAMPLE VII

A 115 pound ream weight natural fiber paper containing 100 percent mercerized cotton linters and having an average density of about 4 was impregnated with nitrile rubber latex modified with melamine resin in such an amount that the combined weight of the rubber and resin in the impregnated sheet was 80 percent of the weight of the fiber. The impregnated sheet was hot calendered, coated with a nitrile rubber ink-transfer surface 0.004 inch in thickness, and press cured to a final thickness of 0.027 inch. This unit was then coated on the back with a 0.002 inch layer of a pressure-sensitive adhesive based on an acrylonitrile rubber.

The replacement unit so made was tested for firmness and compressibility by the tests described above. The unit had a firmness such that a pressure of 36 pounds per square inch had to be exerted on the unit in order to effect an initial compression of two mils, and a compressibility such that an increment of pressure of 80 pounds per square inch had to be applied to the unit in order to increase the compression from two mils to four mils. The impregnated fibrous sheet which formed the compression member of the unit was 0.023 inch thick; it had an initial porosity of 59 percent and a residual porosity of 50.5 percent.

The replacement unit was applied to a blanket carcass and the assembled blanket was found to give excellent results when used in lithographic printing. The assembled blanket had a firmness of 23 pounds and a compressibility such that the increment of pressure needed to increase the compression of the blanket from two mils to four mils was 52 pounds per square inch.

EXAMPLE VIII

A replacement unit was made by the method of Example VII, using a 120 pound ream weight mercerized cotton linters paper having a density of about 4. The compressible body portion of the unit was 0.024 inch thick, had an initial porosity of 59 percent, a residual porosity of 51 percent, and a compressibility such that an increment of pressure of 63 pounds per square inch had to be applied to the sheet in order to increase its compression from two mils to four mils.

The replacement unit so made was applied directly to the blanket cylinder of a lithographic printing press without the use of any backing material. Excellent results were obtained in a lengthy printing test. There was no tendency for the blanket material to shift position or to become loosened from the cylinder during the printing operation.

The compressible materials of the above examples gave excellent results under a wide variety of printing conditions, including the relatively high pressures which must be used in certain types of offset lithographic printing. Quite unexpectedly, they did not distort under these high pressures but gave clear, sharp transfer of the image and excellent reproduction of solid areas. Solid rubber blankets, on the other hand, when used under similar high pressures, distorted badly and, as a result, did not give acceptable printing.

It is apparent from the above examples that, while compressibility is an absolutely necessary property of the sheet material of my invention, the degree of compressibility as measured by the increment of pressure needed to increase the compression of the sheet from two to four mils does not indicate accurately whether a given impregnated fibrous sheet material is suitable for use as the compressible element of a printing blanket. An investigation of the characteristics of the impregnated sheet was therefore undertaken, in an effort to find the property or properties of the sheet which determine its suitability for printing uses.

My earlier work indicated, as shown by Examples I through VI above, that the impregnated fibrous material must have a porosity of at least about 49 percent of the volume of the sheet in order for the necessary compressibility to be present. While this limitation is valid for impregnated sheets having the thickness, weight and impregnation level disclosed in Examples I through VI, it does not hold if these factors are varied substantially from these levels. For example, lighter weight impregnated sheets, i.e. sheets made from lower ream weight papers or having a lower impregnation level, must possess a relatively greater initial porosity, while heavier sheets of somewhat lower initial porosities may be used successfully.

Subsequent tests have shown that the determining property of the impregnated sheet material, rather than being the initial porosity, is the residual porosity after the sheet has been compressed to a certain degree, which for convenience I take as four mils, and that the critical level of residual porosity at four mils compression is independent of differences in weight, thickness, amount of impregnation and initial porosity of the sheets. If the impregnated sheet material has the degree of residual porosity possessed by the materials of Examples I through VI, it will give excellent printing results. If, on the other hand, the residual porosity falls substantially below that of the materials described in Examples I through VI, the sheet will give uneven and unsatisfactory printing. The residual porosity at four mils compression may be computed by means of the same formula set forth above for computing the initial porosity of the sheet. In computing the residual porosity, of course, the total volume of the web will be smaller, since its thickness has been reduced by four mils without increasing its lateral dimensions.

The effect of residual porosity on the behaviour of impregnated sheet materials of varying weights and thickness will be better understood by reference to the following examples.

EXAMPLE IX

A sheet of 78 pound ream weight mercerized cotton linters paper of density about 3.5 was impregnated with nitrile rubber latex modified with melamine resin, to an impregnation level of 80 percent of polymeric material based on the weight of the fibers in the sheet. The impregnated sheet was press cured to a thickness of .0145 inch and was found to have an initial porosity of 55 percent and a residual porosity at four mils compression of 38 percent. This material, when used as the compressible element of a lithograph blanket, gave excellent printing results.

By contrast, a similar sheet, press cured to a thickness of 0.013 inch, was found to have an initial porosity of 50 percent and a residual porosity at four mils compression of 28 percent. This material gave poor and unacceptable printing, characterized by uneven transfer of the printed image.

EXAMPLE X

An impregnated fibrous sheet was made by impregnating a 120 pound ream weight cotton linters paper of density about 4 to an impregnation level of 80 percent with nitrile rubber latex modified by a melamine resin. The sheet, press cured to a thickness of 0.0175 inch, had an initial porosity of 43 percent and a residual porosity at four mils compression of 26 percent. When attached to the metal cylinder of a lithograph printing press, this material gave very poor, uneven printing.

A heavier sheet was made by laminating two plies of the above-described material. This material had the same initial porosity, 43 percent, as the original material, but had a residual porosity at four mils compression of 36 percent. When it was attached to the metal cylinder of a lithograph printing press, this material performed much better than the original single thickness sheet. There was just the slightest evidence of unevenness in the transfer of the image from plate to paper, and the quality of the print could best be described as "borderline" or "fair."

The effect of residual porosity at four mils compression will be further apparent from Table I, which summarizes the results of a series of printing tests in which impregnated sheets of varying residual porosities were used as the compressible elements of lithograph blankets.

*Table I*

| Sample No. | Ream Weight of Paper | Impregnation Level, Percent | Initial Thickness, Mils | Initial Porosity Percent | Residual Porosity Percent | Printing Results |
|---|---|---|---|---|---|---|
| 1 (Examples 1 and 5) | 120 | 72 | 24 | 60.5 | 52.5 | Excellent. |
| 2 (Example 3) | 130 | 60 | 24 | 65 | 58 | Do. |
| 3 (Example 4) | 182 | 72 | 28 | 49.2 | 40.7 | Do. |
| 4 (Example 6) | 118 | 82 | 22.5 | 55.6 | 46 | Do. |
| 5 | 188 | 80 | 24.5 | 60 | 52.2 | Do. |
| 6 | 118 | 80 | 19 | 48 | 34 | Poor, uneven print. |
| 7 | 118 | 137 | 32 | 55 | 48.5 | Excellent. |
| 8 (Example 9) | 78 | 80 | 14.5 | 55 | 38 | Do. |
| 9 (Example 9) | 78 | 80 | 13 | 50 | 28 | Poor, uneven print. |
| 10 (Example 10) | 240 | 80 | 35 | 43 | 36 | Borderline, slightly uneven. |
| 11 (Example 10) | 120 | 80 | 17.5 | 43 | 26 | Poor, uneven print. |
| 12 | 80 | 76 | 17.7 | 65 | 55 | Excellent. |
| 13 | 79 | 76 | 13.3 | 49 | 27 | Poor, uneven print. |
| 14 | 240 | 80 | 40 | 50 | 44.6 | Excellent. |

The test results presented in Table I show clearly that the impregnated fibrous sheets must have a residual porosity at four mils compression of at least about 37 percent in order for the sheets to give good printing results. It is also apparent from Table I that the most important property of the impregnated sheets is not their initial porosity but their residual porosity at four mils compression. Heavier sheets lose a smaller proportion of both their thickness and their porosity when compressed by four mils. As a result, these sheets may have a somewhat lower initial porosity. Conversely, the lighter sheets must have a greater initial porosity in order to compensate for their greater proportional loss, under compression, of both thickness and initial porosity. The residual porosity, then, is a true measure of the printing effectiveness of the sheets, regardless of their weight or thickness.

The material of my invention, therefore, is an impregnated fibrous sheet characterized by the presence of a large proportion of evenly distributed interconnected tiny voids or air spaces, which provide areas into which the surrounding material may be displaced on compression of the sheet. The porosity of the sheet, as shown above, gives to the material its very important property of compressibility. The fiber and rubber constituents of the sheet, on the other hand, impart to the material its firmness and its resilience. The felted, interlocked fibers, bonded by the rubbery impregnant, act as a multitude of tiny, almost microscopic springs which push back against the printing plate or paper, making possible pick up and transfer of the ink. These springs must be strong enough to resist compression under less than the desired printing pressure, and must have enough resilience to spring back quickly when the pressure is released. A high degree of resilience, coupled with the ability to resist distortion, crushing and permanent deformation even after extended use, is a particular advantage of the fiber-reinforced structure of the material of my invention.

The fibrous web from which the material of my invention is made must have a very even formation. It must also have a highly porous, open structure, i.e. a low density, in order that an impregnated sheet of the desired porosity may be made. While I have ordinarily found it convenient to use fibrous webs of 3.5 to 4.5 density (ream weight/thickness in mils), I may also use webs of somewhat higher densities, for example 5 or even 6, if care is taken to avoid too much compaction of the impregnated web. Likewise, lower density webs, for example webs of density 3 or even lower, may be used if desired. The limiting factor in this instance is the practical difficulty of handling and saturating the very weak low density webs. It is apparent from the above that fibrous webs of a rather wide range of densities may be used in making the material of my invention, so long as the finished impregnated web has the desired characteristics, i.e. a residual porosity at 4 mils compression of at least 37 percent.

The weight of the fibrous web may also be varied within a fairly wide range, as shown by the preceding examples. Since, at a given density, the thickness of the sheet is directly proportional to its ream weight, changing the ream weight of the fibrous web provides one method of varying the thickness and the porosity of the finished impregnated sheet. While for most printing purposes, and for the machine settings in current use today, I prefer to use ream weights between about 112 and 120 pounds, acceptable impregnated sheets have been made with ream weights as low as 80 and as high as 240 pounds. Even higher ream weights could be simulated by laminating two or more plies of lower ream weight fibrous webs. As I have pointed out above, the lower weight sheets must have an exceptionally high initial porosity in order to possess the residual porosity necessary for successful printing. In addition, if sheets of much below 80 pound ream weight were used, the material would be so thin that it would retain very little real cushioning effect. If, on the other hand, sheets much thicker than those of 240 pound ream weight were used, there would be practical difficulties in printing with existing machinery, since a normal printing pressure would result in considerably more than the usual four mils compression. It is apparent, then, that the selection of a fibrous web of the proper ream weight is a practical matter and that considerable latitude is possible as long as the porosity of the resulting impregnated sheet falls within the limits set forth above.

Any of the fibers commonly used to produce open, porous felted sheets of even formation may be used in the compressible material of my invention. For example, natural fibers such as wood or cotton, regenerated cellulose fibers such as rayon, or artificial fibers such as nylon or "Dynel" (acrylonitrile-vinyl chloride copolymer fiber) or any suitable combination of fibers may be used. Likewise, while the fibrous webs shown in the above examples have been water-laid felts, air-laid felts may also be used provided they have the necessary qualities of low density and even formation.

A high degree of resilience is, of course, necessary in any cushioning material to be used for printing, as is well-recognized by all who are acquainted with the printing art. The material must, in addition to being compressible, be able to spring back quickly to its original thickness in order that a uniform printing pressure can be exerted. The recovery must also be rapid enough so that the material will be ready to transfer a new impression with each rotation of the printing roll, even at the high speeds such as 500 revolutions per minute which are in common use today. The nature and amount of impregnant used in producing the compressible material of my invention are important because they are, to a large extent, responsible for the resilience and low permanent set of the material.

Any rubbery polymer either in solution or in water dispersion may be used as the impregnant, as for example, natural rubber or any of the well-known synthetic rubbers such as isoprene or butadiene polymers or copolymers, neoprene, Thiokol or polyacrylates. The rubbery polymer must ordinarily be vulcanized or must be modified by the addition of a resinous material in order to increase its toughness, resilience and resistance to attack by solvents. The phenolic, urea, melamine and epoxy resins have been found to be most satisfactory for modifying or reinforcing the rubbery polymer. The amount of the resin to be added depends on the nature of the rubber and of the resin used, and on the degree of toughness desired in the impregnated material. The addition of too large a proportion of resin, however, will result in embrittlement of the sheet. I have found that, in order to impart the necessary resilience to the impregnated fibrous sheet material, the rubber-resin combination must have essentially rubbery characteristics. With the particular rubbers and resins used in the above examples, the upper limit of resin which may be added without destroying the rubbery nature of the combination appears to be about 30 percent based on the combined weight of rubber and resin. Other modifying or cross-linking agents may be added to the impregnant to increase its resilience if desired, or polymers having a high degree of toughness and resilience without further modification may be used.

The amount of impregnant to be used will be determined chiefly by the porosity and resilience desired in the finished impregnated sheet and by practical considerations well-understood by those skilled in the art of impregnating fibrous webs. I have found that, with materials currently available, the necessary resilience may be achieved if the elastomeric impregnant, i.e. the rubbery polymer together with the resinous modifier, if used, is present in the impregnated sheet in the proportion of about 60 percent by weight of solid impregnant based on the weight of the fibrous component of the sheet. It is quite possible that this amount may be substantially reduced as newer, tougher polymers are developed. A larger amount of impregnant may also be used if desired, in order to increase the resilience of the sheet. The upper limit on the amount of impregnant is imposed only by the necessity for maintaining a high degree of porosity in the sheet and by the practical limitations of the impregnating step itself. As shown above, materials of suitable porosity have been made in which the impregnant was present in a proportion of about 140 percent of the weight of the fiber in the sheet. This proportion may be further increased, if desired, as long as the residual porosity of the sheet is maintained above the critical level of 37 percent.

The porosity of the finished impregnated sheet is also dependent on the amount of pressure exerted on the sheet during the drying or curing step. For this reason, care must be taken to use light pressures during cure and to avoid overcompaction of the impregnated sheet.

The compressible material of my invention has been used successfully, as shown by the above examples, and the experimental results presented in Table I, as the cushioning element in a lithograph blanket. It has given particularly outstanding performance as the replaceable member of a lithograph blanket. It has even been cemented directly to the cylinder of a printing press without any backing member, and has given excellent service for extended runs when used in this way.

An outstanding advantage of the lithograph blankets made from the compressible material of my invention is that they permit the development of uniform printing pressures without any necessity for the expensive and tedious grinding step to which conventional solid rubber blankets are often subjected. Blankets made by the method shown in the examples are very uniform in thickness and have smooth, even printing surfaces. In addition, because of their compressible nature, these blankets are able to compensate for minor deviations in the thickness of the blanket without any substantial pressure variation. Furthermore, I have found blankets made according to the above examples to be less subject to damage by lumps of dried ink or dust or to the formation of low spots due to the printing of cards or envelopes. I believe that the improved performance of my compressible blankets in this respect is due to the fact that they do not develop high localized pressures in regions of greater compression, and therefore are not subject to permanent damage from such influences as are the conventional solid rubber blankets.

Another and most important advantage of the lithograph blankets containing the compressible material of my invention is their excellent resistance to distortion under printing pressures. Because of its volume compressibility, the new material undergoes little or no lateral distortion when it is squeezed between the rolls of a printing press. This lack of distortion makes posible the transfer of a clear, sharp image even under printing pressures so high that conventional rubber blankets give only blurred and distorted images. Distortion may be measured by a microscopic inspection of the dots transferred from a half-tone plate to the paper being printed, and a direct comparison with the size and shape of the dots on the plate. In another method of measuring distortion, a small sample of material of known area is pressed between two glass plates which are arranged in such a manner that the change in surface area of the sample with increasing pressure may be measured. The change in area of a sample of material at any given compression can be used as a measure of its distortability. I have found, by means of such a test, that the compressible material of my invention undergoes only about 10 percent as much lateral distortion as the standard solid rubber blankets when subjected to the amount of compression normally encountered in printing. Increase of the compression on the blanket by the addition of extra layers of packing material, which is desirable under certain printing conditions, has no adverse effect on the quality of printing which may be made with the compressible material of my invention. As the compression of rubber blankets is increased, however, distortion increases sharply, to the point where the printing becomes completely unacceptable.

The resistance to distortion exhibited by the material of my invention has another important advantage in lithographic printing. The surfaces of the plates used in lithography are rather quickly destroyed by the "wiping" action of the rubber blanket, which is caused by the lateral creep or distortion of the rubber. The material of my invention does not distort; it compresses. It, therefore, does not have a wiping effect on the plates, with the result that the life of the plates is dramatically increased. The compressible material of my invention, furthermore, is able to absorb in a vertical direction the printing pressures which are exerted on it and therefore does not build up the rolling pressure wave which is a characteristic fault of the rubber blanket.

Resistance to distortion under printing conditions, then, the property which distinguishes my compressible sheet material and printing blankets which incorporate this new material from the conventional solid rubber blankets of the prior art.

Resistance to distortion, the development of even, uniform printing pressures and the ability of the material to compensate for irregularities encountered during printing have led to another important printing use for my new material, namely its use as a packing on the impression cylinder in letter press printing. Letter press printing is similar in many ways to lithographic printing. In both cases, a uniform printing presure is absolutely necessary in order to produce high quality printing. In both cases, also, irregularities are encountered in the press cylinders, plates, and paper. The effect of these irregularities must somehow be compensated for, either through the use of a resilient cushioning material or by make-ready, in order to achieve the necessary uniform printing pressures.

The packing material most widely used at the present time is made by building up on the impression cylinder layers of paper called tympan sheets, which cushion the impact of the type against the paper being printed and help develop the necessary pressure for transfer of the ink. This type of packing does not have a high enough resilience to compensate for the irregularities normally encountered in the type, the cylinders of the press, etc., making it necessary to build up certain areas by placing extra packing material under the tympan sheets or plates. This tedious job, called "make-ready," is to be avoided whenever possible. In addition, the tympan sheets lose their resilience rather quickly in use, and must ordinarily be replaced after a run of one or two million impressions. Attempts have been made in the past to use more highly resilient materials such as solid rubber blankets for this type of work. Because of their distortability, however, they are not able to press the paper squarely against the type without developing a rolling pressure wave. For this reason, their use has been severely limited.

The compressible maetrial of my invention, which combines resistance to distortion with a very high resilience and low permanent set, has proved to be an ideal material for use as packing on the impression cylinder of a letter press. It eliminates the need for make-ready. It gives excellent printing results over a longer period of use, as many as 50 million impressions having been run with my material without need for replacement of the packing. A most dramatic effect of the use of my new material is its ability to stop the vibration to which certain rotary presses are subject, and to make possible quiet, chatter-free operation of the presses.

The compressible material may be held in place on the impression cylinder by mechanical means such as clamps, or it may be cemented to the cylinder by any suitable adhesive. Particularly succesful results have been obtained by using replacement elements such as those described above, which carry a layer of pressure-sensitive adhesive on one side of the compressible material. The residual porosity at four mils has been found to be the controlling factor in the effectiveness of the new compressible material in letter press printing also. Above 37 percent residual porosity at four mils compression, the material gives the excellent results described above. When the porosity drops below this figure, however, the material does not have enough springiness to compensate for the irregularities encountered in printing, and its behaviour approximates that of the tympan sheets, requiring the usual make-ready.

It is apparent from the foregoing disclosure that the essence of my invention is a resilient, compressible impregnated fibrous sheet material having a high degree of porosity. This material has been found to be useful for a number of printing purposes. It is particularly suitable for use as the cushioning element in lithograph blankets and as the packing material on the impression cylinders in letter press printing.

This application is a continuation-in-part of abandoned application Serial No. 767,610, filed October 16, 1958, and of copending application Serial No. 842,758, filed September 28, 1959, now abandoned.

I claim:

1. A resilient compressible element for printing use which comprises a highly porous felted fibrous sheet impregnated with an elastomeric material, the impregnated sheet having a firmness such that a pressure of at least about 10 pounds per square inch must be exerted on the sheet to effect an initial compression of 2 mils, and a residual porosity at 4 mils compression of at least about 37 percent.

2. A compressible element according to claim 1 in which the porous felted fibrous sheet has been impregnated with an elastomeric material in water dispersion.

3. A compressible element according to claim 1 in which the elastomeric material comprises a mixture of rubbery and resinous polymers.

4. A blanket for lithographic printing which includes the following elements: a substantially non-extensible backing member; a resilient compressible body portion which comprises a highly porous felted fibrous sheet impregnated with an elastomeric material, the impregnated sheet having a firmness such that a pressure of at least about 10 pounds per square inch must be exerted on the sheet to effect an initial compression of 2 mils, and a residual porosity at 4 mils compression of at least about 37 percent; and a thin ink-transfer surface.

5. A blanket for lithographic printing which includes a substantially non-extensible backing member and a resilient, compressible replaceable unit removably adhered thereto, the replaceable unit being composed of a highly porous felted fibrous sheet impregnated with an elastomeric material, the impregnated sheet having a firmness such that a pressure of at least about 10 pounds per square inch must be exerted on the sheet to effect an initial compression of 2 mils, and a residual porosity at 4 mils compression of at least about 37 percent; and a thin surface layer on said impregnated sheet capable of receiving and transferring a printed image.

6. A replacement unit for a lithographic printing blanket which includes a thin ink-transfer surface and a resilient, compressible body portion composed of a highly porous felted fibrous sheet impregnated with an elastomeric material, the impregnated sheet having a firmness such that a pressure of at least about 10 pounds per square inch must be exerted on the sheet to effect an initial compression of 2 mils, and a residual porosity at 4 mils compression of at least about 37 percent.

7. A replacement unit according to claim 6 in which the porous felted fibrous sheet has been impregnated with an elastomeric material in water dispersion.

8. A replacement unit according to claim 6 in which the elastomeric material comprises a mixture of rubbery and resinous polymers.

9. An offset blanket suitable for direct application to the blanket cylinder of a lithographic printing press which consists essentially of a thin ink-transfer surface and a resilient, compressible body portion composed of a highly porous felted fibrous sheet impregnated with an elastomeric material, the impregnated sheet having a firmness such that a pressure of at least about 10 pounds per square inch must be exerted on the sheet to effect an initial compression of 2 mils, and a residual porosity at 4 mils compression of at least about 37 percent.

10. A packing material for cushioning the impression cylinder of a letter press which includes a highly porous felted fibrous sheet impregnated with an elastomeric material, the impregnated sheet having a firmness such that a pressure of at least about 10 pounds per square inch must be exerted on the sheet to effect an initial compression of 2 mils, and a residual porosity at 4 mils compression of at least about 37 percent.

References Cited in the file of this patent

UNITED STATES PATENTS

| | | |
|---|---|---|
| 1,096,112 | Kush | May 12, 1914 |
| 1,311,596 | Ellis | July 29, 1919 |
| 2,011,248 | Knowlton | Aug. 13, 1935 |
| 2,054,620 | Freedlander | Sept. 15, 1936 |
| 2,232,664 | Neiley | Feb. 18, 1941 |
| 2,540,690 | Pritchard | Feb. 6, 1951 |